Aug. 18, 1925.
E. W. HAMM ET AL
CLAMP
Filed Sept. 22, 1924
1,550,161
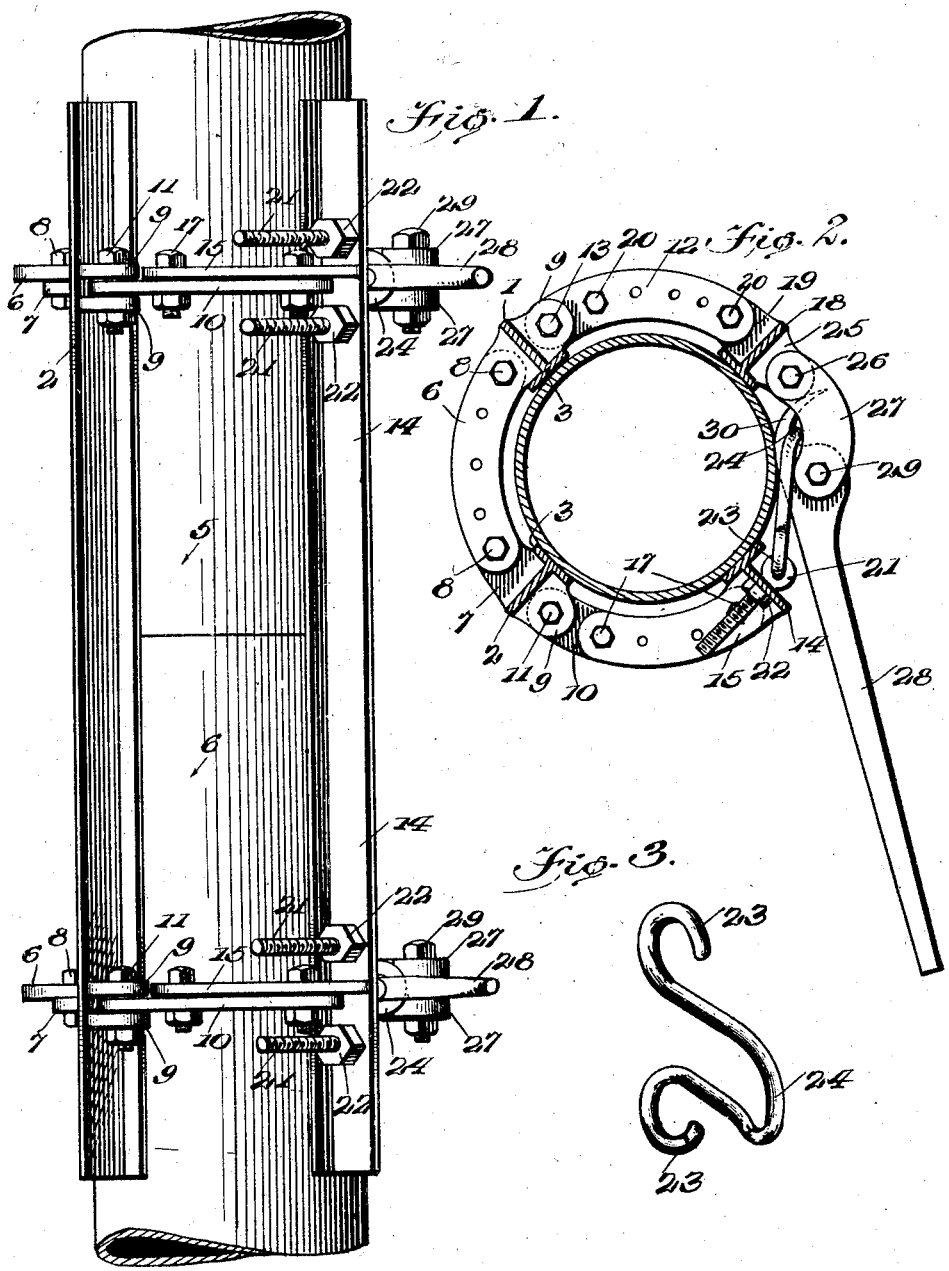
WITNESSES
INVENTOR
E. W. Hamm,
D. B. Schull,
BY
ATTORNEYS Patented Aug. 18, 1925.

1,550,161

UNITED STATES PATENT OFFICE.

ELLIS W. HAMM AND DANIEL B. SCHULL, OF BEAUMONT, TEXAS.

CLAMP.

Application filed September 22, 1924. Serial No. 739,229.

*To all whom it may concern:*

Be it known that we, ELLIS W. HAMM and DANIEL B. SCHULL, citizens of the United States, and residents of Beaumont, in the county of Jefferson and State of Texas, have invented certain new and useful Improvements in Clamps, of which the following is a specification.

This invention relates to clamps, and has for its object the provision of a device for rigidly locking a pair of pipes in contiguous relation with the ends abutting in close association so that the abutting ends may be welded.

A further object of the invention is the provision of a device for clamping the ends of pipes in abutting relation and in alinement for welding purposes, the device being adjustable for adaptation to pipes of various diameters.

This invention will be best understood from a consideration of the following detailed description in view of the accompanying drawing forming a part of this specification; nevertheless, it is to be understood that the invention is not confined to the disclosure, being susceptible of changes or modifications, but such changes or modifications shall mark no material departure from the salient features of the invention as expressed in the appended claims.

Figure 1 is a side view of the clamp applied to a pair of alined pipes,

Fig. 2 is a transverse section of the clamping device and the pipes, and

Fig. 3 is a view in perspective of the shackle forming part of the clamp.

Referring more particularly to the drawings 1 and 2 designate angle-iron bars T-shaped in cross-section with the heads 3 disposed inwardly and adapted to engage a pair of abutting and alined pipes 4 and 5. The angle iron bar 1 is provided with an arcuately shaped lug 6 adapted to be placed in close contact with a similar shaped lug 7 on the bar 2. These lugs are provided with a plurality of spaced perforations adapted to be alined and thru which bolts 8 are inserted for connecting the lugs together. Upon the opposite faces of the bars there is provided a pair of spaced ears 9. An arcuately shaped member 10 is pivoted at 11 between the ears 9 of the bar 2 while an arcuately shaped member 12 is pivoted at 13 between the ears 9 of the bar 1.

A bar 14 T-shaped in cross-section and similar in construction to the bars 1 and 2 has an arcuately shaped rearwardly projecting lug 15 in close contact with the pivoted member 10 with the member 10 and lug 15 being provided with a plurality of spaced perforations adapted to aline for the reception of bolts 17 for locking the lug 15 to the member 10. A bar 18 T-shaped in cross-section has a rigidly connected lug 19 arcuately shaped and provided with a plurality of perforations alining with perforations in the pivoted member 12 for receiving bolts 20, whereby the pivoted member 12 is locked to the lug 19 of bar 18.

Upon opposite sides of the lug 15 is provided a pair of screw eyes 21 passing through perforations in the bar 14 and locked to said bar by a nut 22. The eyes are adapted to receive the pair of hooks 23 upon the end of the shackle 24, the shackle being hinged from the eyes 21.

The bar 18 is provided with a laterally projecting ear 25 upon which is pivotally mounted at 26, a pair of arcuately shaped bars 27. The toggle lever 28 is pivoted at 29 between the bars 27 and is provided with a hook 30 adapted to engage the shackle 24 so that when the lever is moved to the position shown in Fig. 2, the bars 1, 2, 14 and 18 are clamped to the pipes 4 and 5 for rigidly locking the abutting ends of said pipes in close contact with each other so that the pipes may be welded in any approved manner and at the points appearing between the spaced bars 1, 2, 14 and 18.

When it is necessary to apply the clamp to pipes of larger diameter it is only necessary to remove any of the adjusting bolts 17, 20 and 8 for alining different perforations in the various connecting links of the clamp for increasing the diameter of the clamp.

We claim:

1. A pipe clamp for clamping the ends of a pipe together, comprising a plurality of longitudinally spaced clamping bars, a pair of the bars being provided with arcuately shaped lugs projecting toward each other and adapted to be placed in juxtaposition, said lugs being provided with alined perforations, and bolts adapted to be inserted between the perforations for locking the lugs together, links pivotally connected to the opposite faces of the pair of bars, the other bars being provided with laterally projecting arcuately shaped lugs projecting toward the pivoted links, the lugs of the last-mentioned bars and the pivoted links having cooperating perforations adapted to be alined, and bolts insertable through the alined perforations for locking the links to the lugs, a shackle pivoted to one of the last-mentioned bars and a toggle lever pivoted to the other of the last-mentioned bars and adapted to engage the shackle whereby when the lever is operated the bars will be rigidly clamped against the side walls of alined pipe ends.

2. A pipe clamp for clamping the ends of a pipe together, comprising a plurality of spaced clamping bars, the pairs of bars provided with lugs projecting towards each other, said lugs being provided with alined perforations, and bolts received by the perforations for locking the lugs together, links pivotally connected to the pairs of bars, the other bars being provided with laterally projecting lugs, the lugs of the last-mentioned bars and the pivoted links having cooperating perforations adapted to be alined and bolts inserted through the alined perforations for locking the links to the lugs, a toggle lever pivoted to one of the last-mentioned bars, and means pivoted to the other of the last-mentioned bars and adapted to be engaged by the toggle lever whereby when the lever is operated the bars will be rigidly clamped against the side walls of alined pipe ends.

DANIEL B. SCHULL.
ELLIS W. HAMM.